United States Patent Office 2,807,524
Patented Sept. 24, 1957

2,807,524
WAX COMPOSITION

John D. Tench, Prospect Park, Pa., assignor to Sun Oil Company, Philadelphia, Pa., a corporation of New Jersey No Drawing. Application March 17, 1955,
Serial No. 495,069

2 Claims. (Cl. 44—7.5)

This invention relates to novel wax compositions and more particularly relates to novel wax compositions especially suitable for use in the preparation of candles, and to candles prepared from these compositions.

Although the art of making candles is old and well established, the problem of eliminating soot formation in the candle flame has not heretofore been satisfactorily solved. Soot formation is objectionable since it imparts an unsightly appearance to the candle flame and forms deposits on nearby objects. This objection is especially serious in candles designed to burn in a confined space such as a glass container, since in such instance even a small amount of soot formation by the candle flame causes a black deposit on the glass of the container.

An object of the invention is to provide novel wax compositions especially suitable for the preparation of candles. A further object is to provide a new article of manufacture comprising a candle, formed from a novel wax composition, which does not exhibit appreciable soot formation on burning. Other objects and their attainment in accordance with the invention will be apparent from the following specification.

It has now been found that the incorporation of minor amounts of bis-cyclopendadienyl iron in wax or wax compositions provides a wax composition from which candles can be prepared which do not exhibit appreciable soot formation on burning. It appears that bis-cyclopentadienyl iron, when incorporated in candle wax, in some way enters into the combustion reaction as the candle burns, so that soot formation, which would otherwise be observed, is substantially eliminated.

Waxes which may be employed in the present invention are those known to be suitable for candle preparation. In general, the wax will consist of paraffin wax, or at least contain a major proportion of paraffin wax. Other materials, including other waxes, may be incorporated therewith to impart desirable properties to the final composition. For example, minor quantities of stearic acid, hydroxystearic acid, beeswax, microcrystalline wax, ceresin, beta-naphthol, and mixtures thereof, may be incorporated with the paraffin wax. Coloring materials such as dyes may also be employed if desired. It is preferred to employ compositions containing at least 50% paraffin wax having a melting point of from about 40° C. to 80° C. As illustrative of various wax compositions in which bis-cyclopentadienyl iron can be incorporated, paraffin wax having a melting point of about 52° C. having incorporated therein from about 2% to 10% stearic acid, or about 10% hydroxystearic acid, gives good results. A composition containing about 70% paraffin wax, 25% microcrystalline wax and 5% beeswax also gives good results. It is preferred in all instances to employ ingredients such that the final wax composition has a melting point within the range of from about 40° C. to 80° C.

In accordance with the invention, from 0.01 to 0.5% by weight of bis-cyclopentadienyl iron is incorporated in the wax composition. Preferably from about 0.05 to 0.3% by weight of bis-cyclopentadienyl iron is incorporated in the wax since excellent results are achieved with a quantity of bis-cyclopentadienyl iron within this defined range. Thus, in accordance with the invention, incorporation of from 0.01 to 0.5%, and preferably from 0.05 to 0.3%, of bis-cyclopentadienyl iron in a wax or wax composition, as above described, provides a novel wax composition which is especially suitable for the preparation of candles.

The bis-cyclopentadienyl iron may be incorporated in the wax composition by any convenient means. It is preferred to incorporate the bis-cyclopentadienyl iron by dissolving or suspending an appropriate quantity thereof in the wax or wax composition. This is advantageously accomplished by adding the bis-cyclopentadienyl iron, with agitation, to the molten wax or wax composition to dissolve and/or disperse the iron compound therein. Concentrates of the iron compound in wax may be prepared by dissolving or dispersing a relatively large quantity of bis-cyclopentadienyl iron, say from about 0.5 to 20% in wax, and this concentrate employed to prepare wax compositions for candle manufacture by adding an appropriate quantity thereof to molten wax with stirring. Other means may be employed, if desired, such as by dissolving an appropriate quantity of bis-cyclopentadienyl iron in a single component of the wax composition and adding the resulting concentrate to the remaining components, preferably while molten. For example, if a quantity of hydrocarbon oil is to be incorporated in the wax composition, a concentrate of bis-cyclopentadienyl iron in the oil can be prepared, such as by dissolving the iron compound in the oil, and the resulting composition then incorporated in the wax. When incorporating bis-cyclopentadienyl iron in molten wax, adequate stirring should be provided to obtain a uniform solution or dispersion of the iron compound in the molten mass.

The articles of manufacture of the present invention may be prepared from the novel wax compositions by methods heretofore known. For example, the candles may be prepared by molding or dipping with good results. For candles designed to burn within a casing, such as a glass container, the preparation may be by introducing molten wax into the casing to surround a wick positioned therein, and permitting the composition to solidify.

The selection of a wick in candle manufacture is important but within the scope of those skilled in the art. By using the wax composition of the invention, the selection of a wick may be from a wider range of compositions and sizes than would otherwise be permissible, since soot formation which otherwise would be observed is eliminated.

The following example illustrates the novel wax compositions and articles of manufacture of the invention.

Example

A wax suitable for candle manufacture was prepared by blending a paraffin wax having a melting point of about 47° C. with a microcrystalline wax having a melting point of about 67° C. Both waxes were derived from slack wax obtained by dewaxing petroleum lubricating oil, the paraffin wax being from a distillate fraction of the slack wax and the microcrystalline wax being from the residual portion of the slack wax. The melting point of the paraffin-microcrystalline blend was about 49° C. Compositions according to the invention were prepared by introducing various quantities of bis-cyclopentadienyl iron into the molten wax blend, with stirring, to obtain a homogeneous composition. The incorporation of the iron compound did not appreciably affect the melting point or color of the composition.

Candles were prepared by introducing the wax composition, while molten, into glass jars having a diameter of about 3 inches and a height of about 8.8 inches. A wick consisting of cotton yarn on a plastic core was vertically positioned through the jar before filling with the molten composition, so that on solidification a candle contained in the glass jar was formed. Metal tops containing a multiplicity of holes were positioned on the glass jars and the candles ignited.

The candles were burned for about 4 days and the following results obtained:

A. A candle containing no bis-cyclopentadienyl iron burned with considerable soot formation; a heavy black coating rapidly formed on the glass container and metal top, the deposit becoming heavier as the burning continued.

B. A candle containing 0.05% by weight bis-cyclopentadienyl iron burned with only a very slight formation of soot; at the end of 4 days a light soot deposit was observable at the top of the glass jar and on the metal cap.

C. A candle containing 0.2% by weight bis-cyclopentadienyl iron burned with no observable soot formation; at the end of 4 days a very light discoloration at the top of the jar and a very light brownish discoloration on the metal cap were discernible. No soot formation was observed.

Other wax compositions suitable for candle manufacture and containing a quantity of bis-cyclopentadienyl iron within the herein defined limits, and candles prepared therefrom, give results substantially equivalent to those obtained in the above examples.

The invention claimed is:

1. A new composition of matter consisting essentially of a major proportion of paraffin wax and from 0.01% to 20% bis-cyclopentadienyl iron.

2. A new composition of matter consisting essentially of a major proportion of paraffin wax and from 0.01% to 0.5% bis-cyclopentadienyl iron.

References Cited in the file of this patent

UNITED STATES PATENTS 2,638,411     Thompson et al. _____ May 12, 1953